April 10, 1962 H. K. VAN JEPMOND 3,029,309

METHOD OF OPERATING A SECRECY COMMUNICATION SYSTEM

Original Filed Dec. 9, 1953 4 Sheets-Sheet 1

HOWARD K. VAN JEPMOND
INVENTOR.

BY James E. Tracy

HIS ATTORNEY.

HOWARD K. VAN JEPMOND
*INVENTOR.*

BY James E. Tracy
HIS ATTORNEY.

METHOD OF OPERATING A SECRECY COMMUNICATION SYSTEM

Original Filed Dec. 9, 1953 4 Sheets-Sheet 3

INVENTOR.
HOWARD K. VAN JEPMOND
BY James E. Tracy
HIS ATTORNEY.

HOWARD K. VAN JEPMOND
*INVENTOR.*

BY James E. Tracy

HIS ATTORNEY.

United States Patent Office 3,029,309

Patented Apr. 10, 1962

3,029,309

METHOD OF OPERATING A SECRECY COMMUNICATION SYSTEM

Howard K. Van Jepmond, Evanston, Ill., assignor to Zenith Radio Corporation, a corporation of Delaware Original application Dec. 9, 1953, Ser. No. 397,176, now Patent No. 2,929,865, dated Mar. 22, 1960. Divided and this application May 28, 1959, Ser. No. 816,463

2 Claims. (Cl. 179—1.5)

This invention pertains to secrecy communication systems in which an intelligence signal is transmitted in coded form to be utilized only in a receiver equipped with a decoding device controlled in accordance with the coding schedule employed at the transmitter. More particularly, the invention relates to a novel apparatus for use in such a secrecy communication system to prevent transient distortion attributable to the coding or decoding operation. The invention may be practiced in either a transmitter or receiver. The novel arrangement of the present invention is particularly attractive when incorporated into the audio encoding portion of a subscription television system and for that reason is described in such an environment. This application is a division of copending application Serial No. 397,176, filed December 9, 1953, issued March 22, 1960, as Patent 2,929,865, and assigned to the present assignee.

Numerous secrecy systems have been proposed in which an intelligence signal, for example an audio signal, is coded by altering some characteristic of that signal, such as phase, usually at randomly spaced time intervals determined by a coding schedule which is made known only to authorized receivers. Most of these secrecy systems do effect adequate coding or scrambling of the intelligence signal. However, when the coded intelligence signal is subjected to the decoding operation at an authorized receiver, the compensating characteristic variations often times do not occur in exact time coincidence with the corresponding changes made at the transmitter, and this may result in the generation of undesirable transient pulses reflected as distortion in the coded signal. Such distortion, of course, detracts from the fidelity or quality of reproduction of the intelligence signal. In accordance with the present invention, this objectionable distortion is eliminated by sampling the decoded intelligence signal only at times other than the characteristic-variation or mode-changing times and then shaping the wave form of the output signal containing the sampled portions to simulate that of the decoded intelligence signal prior to sampling. In this way, the decoded intelligence signal is only sampled or examined during intervals when no distortion is present, giving rise to a distortion-free signal.

Although the term "sampling" is well-known and understood, it is helpful to recite a definition. Sampling is a process wherein only portions of an intelligence signal are translated to develop a modified signal representing the original intelligence signal. The portions sampled may amount to only a small percentage of the intelligence signal or they may amount to almost 100%. It is relatively a simple matter to simulate and reproduce the original intelligence signal from its modified or sampled form by means of an envelope detector or low-pass filter.

It is, accordingly, an object of the present invention to provide a new and improved method of operating a secrecy communication system for producing a coded or decoded intelligence signal which is relatively free of transient distortion.

It is an additional object of the invention to provide a novel method for encoding an intelligence signal.

The present invention provides a method of altering (namely, either coding or decoding) an intelligence signal under the control of a control signal without introducing transient distortion. The method comprises the step of sharply and abruptly varying a characteristic of the intelligence signal at selected times determined by a predetermined code schedule as represented at least in part by the control signal to alter (code or decode) the intelligence signal. The altered intelligence signal is sampled under the control of the control signal only at times different from the selected times. An output signal is derived consisting of the sample portions of the altered intelligence signal. Finally, the method includes the step of shaping the wave form of the output signal to simulate that of the altered intelligence signal prior to sampling.

The features of this invention which are believed to be new are set forth with particularity in the appended claims. The invention, together with further objects and advantages thereof, may best be understood, however, by reference to the following description in conjunction with the accompanying drawings, in which:

FIGURE 1 is a schematic representation of a secrecy communication system, specifically a subscription television receiver, constructed in accordance with one embodiment of the invention;

FIGURES 2 and 3 comprise various curves useful in explaining the operation of the secrecy system;

While the present invention is applicable to any type of secrecy communication and, moreover, to any type of coding, it is illustrated in connection with a subscription television receiver only for convenience. Furthermore, it should be understood that the method of the present invention may be applied to the transmitter as well as the receiver portion of a secrecy system since often times it is desirable to eliminate any telltale transient pulses that may be introduced into the audio signal by the coding process each time a mode change is made and which may be subsequently derived from the audio signal and utilized in unauthorized decoding.

Figure 1:
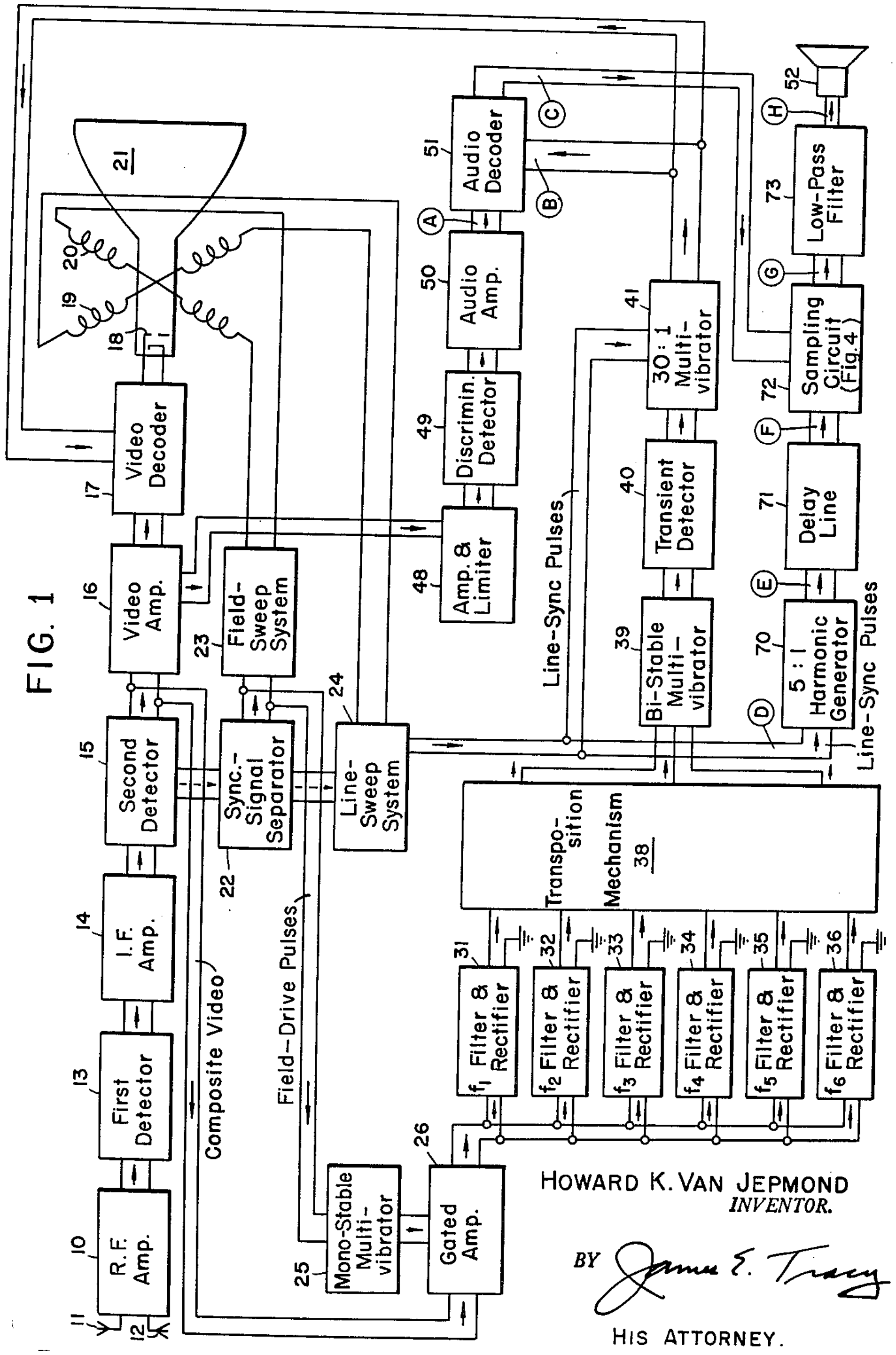

A major portion of the receiver of FIGURE 1, in fact the entire video decoding section, is described and claimed in copending application Serial No. 366,727, filed July 8, 1953, and issued September 16, 1958, as Patent 2,852,598, in the name of Erwin M. Roschke, and assigned to the present assignee. For that reason a detailed illustration or description of some of the components will not be included in the present application in order to avoid unnecessarily encumbering the drawings. In the Roschke application, a system is disclosed wherein a combination of encoding signal components, individually having a predetermined identifying characteristic such as frequency, is generated at the transmitter and transmitted to subscriber receivers along with the composite video signal during each of what may be called reset-time intervals, such as field-retrace intervals. These components, which are preferably randomly sequenced and randomly appearing within the combination, are derived from the video signal at each receiver and by means of suitable filters are segregated from one another for application over assigned input circuits to a transposition mechanism. Each mechanism may employ a family of toggle switches which are adjusted in accordance with a pre-arranged switch-setting pattern known only to authorized subscribers, and is utilized to selectively establish a multiplicity of circuit connections between the input circuits and a plurality of output circuits, which are connected to various input circuits of a multi-stable device such as a bi-stable multivibrator. With this arrangement, the encoding signal components may be applied to the input circuits of the multi-stable device in a prescribed sequence to operate this device from one to another of its stable operating conditions to develop what may be called a composite reset signal at its output terminals.

The transmitter and receivers of the aforementioned Roschke system further include counting devices each having a sequence of operating steps for producing a control signal in response to line-synchronizing pulses to effect mode changes in a system preferably at a faster-than-field rate; specifically, the television signal may be coded at the transmitter and decoded at the receivers by altering the time relationship between the video and synchonizing components of the television signal at intervals occurring more frequently than the field-scanning intervals. To introduce additional security into the system, each counting mechanism is reset to a reference condition at any selected one of a plurality of different predetermined times during each one of the reset-time intervals by "keying" or "phasing" each counter by a preselected characteristic variation of each composite reset signal.

The control signal developed in each of the various counters, which exhibits amplitude changes occurring preferably at a faster-than-field rate and in accordance with the coding schedule, is also used in the Roschke system to encode the audio intelligence. This is accomplished by applying the control signal to the deflection electrodes of a beam-deflection device having a control grid modulated in accordance with the audio intelligence and a pair of collector anodes connected to opposite terminals of the primary winding of an output transformer. With this arrangement, the phase of the audio signal is effectively inverted at the secondary winding of the transformer each time the beam switches from one anode to the other, and this occurs each time there is an amplitude variation of the control signal.

The audio phase inversion process of the Roschke system is subject to the introduction of transient distortion since the mode changes may not occur in exact synchronism at the transmitter and receiver; inasmuch as such mode changes occur at a faster-than-field rate, namely every 15 line-trace intervals in the illustrated embodiment of the Roschke application, the frequency of the transients may fall in the audible range. Accordingly, the receiver to be described is constructed in accordance with the present invention to utilize the telecast originating at the transmitter of the aforementioned Roschke application but is further adapted to eliminate any possible distortion that may be present in the decoded audio signal.

More specifically, the receiver of FIGURE 1 comprises a radio-frequency amplifier 10 having input terminals connected to an antenna circuit 11, 12 and output terminals connected to a first detector 13, the output terminals of the detector being connected to an intermediate-frequency amplifier 14. The output terminals of the intermediate-frequency amplifier are connected through a second detector 15 to a video amplifier 16 which, in turn, is coupled through a video decoder 17 to the input electrodes 18 of a cathode-ray image-reproducing device 21. Decoder 17 may be similar to that disclosed and claimed in copending application Serial No. 243,039, filed August 22, 1951, and issued August 7, 1956, as Patent 2,758,153, in the name of Robert Adler, and assigned to the present assignee. It may comprise a beam-deflection tube having a pair of output circuits which may be selectively coupled into the video channel as the electron beam thereof is deflected in synchronism with the mode changes of the transmitted video signal from one to the other of two segmental anodes coupled to such output circuits. One of the circuits includes a time-delay network so that the variations in the timing of the video components relative to the synchronizing components of the received television signal may be compensated in order effectively to decode the television signal as the beam of the deflection tube is switched between its anodes. This switching effect is accomplished by means of a beam-deflection control or actuating signal applied to video decoder 17, as explained hereinafter.

Second detector 15 is also coupled to a synchronizing-signal separator 22, which, in turn, is coupled to a field-sweep system 23 and a line-sweep system 24. The output terminals of sweep systems 23 and 24 are connected respectively to field-deflection elements 20 and line-deflection elements 19 associated with reproducing device 21.

Video amplifier 16 is also connected to an amplifier and amplitude limiter 48 which, in turn, is coupled through a discriminator-detector 49 to an audio amplifier 50. The output terminals of amplifier 50 are connected to one pair of input terminals of an audio decoder 51. This decoder, as explained briefly hereinbefore, and in detail in the aforementioned Roschke application may comprise a beam-deflection device which is actuated in accordance with the coding schedule to effect compensating phase inversions of the coded audio signal to effectively decode that signal. In accordance with the present invention, however, instead of connecting the output circuit of audio decoder 51 to a speaker, as in the aforementioned Roschke system, it is connected to one pair of input terminals of a sampling device or circuit 72 which may be of any well-known construction. Line-synchronizing pulses are derived from line-sweep system 24 and applied to a 5:1 harmonic generator 70 which, in turn, is connected through a delay line 71 to another pair of input terminals of sampling device 72. The output circuit of sampler 72 is coupled through a frequency-selective means, such as a suitable low-pass filter 73, to the input terminals of a speaker 52.

In the illustrated embodiment of the system, the code signal may comprise six bursts of various signal frequencies which are individually transmitted between the line-drive pulses superimposed on the vertical-blanking pulse. In order to facilitate the separation of these signal components, it is desirable to provide circuitry which will "gate in" only that portion of the composite video signal containing such components. To that end, field-drive pulses are derived from synchronizing-signal separator 22 and supplied to a mono-stable multivibrator 25 having output terminals connected to a normally-closed gated amplifier 26. The output terminals of second detector 15 are also connected to gated amplifier 26 to supply the composite video signal thereto, and the output circuit of this amplifier is connected to the input circuits of each one of a series of filter and rectifier units 31–36 to facilitate the separation of the code signal components from each other for selective application to a series of input circuits of a transposition mechanism 38, which is preferably similar to a corresponding mechanism employed at the transmitter.

Transposer 38 has three output circuits connected to respective input circuits of a bi-stable multivibrator 39 and is provided for the purpose of connecting any one of the output circuits from filter and rectifier units 31–36 to any one of the input circuits of bi-stable multivibrator 39. With this arrangement, the code signal components, during any reset-time interval, may be applied to the input circuits of multivibrator 39 in a controlled sequence to operate the multivibrator from one to another of its stable operating conditions. The output signal from the multivibrator consequently undergoes a series of amplitude excursions during each field-retrace interval at a randomly or irregularly timed rate. If the various interconnections established by mechanism 38 are identical to the interconnections established by the similar mechanism at the transmitter, decoding is effected. The mechanism setting information is disseminated only to authorized subscribers and a suitable charge may, of course, be assessed for such information.

The composite reset signal developed at the output terminals of multivibrator 39, which has a characteristic that varies in accordance with the schedule represented by the combination of frequency bursts transmitted during each field-retrace interval, is applied to a transient detector 40 which, in turn, is connected to one pair of input terminals of a counting mechanism such as a 30:1 multivibrator 41, this multivibrator having another pair of input terminals connected to line-sweep system 24 to receive line-synchronizing pulses therefrom. Detector 40 is responsive to at least one selected variation of the composite reset signal developed by multivibrator 39 during each of the reset-time intervals for developing a reset component.

Multivibrator 41 may be constructed in conventional manner such that it requires 30 line-synchronizing pulses to execute a complete cycle of operations thereby to develop a square-wave control signal having an amplitude excursion in response to each series of 15 successive line-synchronizing pulses. In other words, counting mechanism 41 executes a sequence of operating steps to produce a control signal exhibiting an amplitude characteristic which periodically varies between two predetermined values upon the completion of each sequence. Transient detector 40 is coupled to counting mechanism 41 in order to apply each of the reset components thereto for effecting actuation of that mechanism to a predetermined reference condition to modify the control signal otherwise developed therein.

The output terminals of counting mechanism 41 are coupled to the deflection elements of both video decoder 17 and audio decoder 51 to supply an actuating or deflection-control signal thereto.

In operation, the coded television signal is intercepted by antenna circuit 11, 12, amplified in radio-frequency amplifier 10 and heterodyned to the selected intermediate frequency of the receiver in first detector 13. The resulting intermediate-frequency signal is amplified in intermediate-frequency amplifier 14 and detected in second detector 15 to produce a composite video signal. This latter signal is amplified in video amplifier 16, translated through video decoder 17, and impressed on the input electrodes 18 of image-reproducing device 21 to control the intensity of the cathode-ray beam of the device in well-known manner.

The synchronizing components are separated in separator 22, the field-synchronizing components being utilized to synchronize sweep system 23 and, hence, the field scansion of device 21, whereas the line-synchronizing components are utilized to synchronize sweep system 24 and, therefore, the line scansion of device 21.

Field-drive pulses from separator 22 are also supplied to mono-stable multivibrator 25 to produce a gating pulse for normally-closed gated amplifier 26. The parameters of the multivibrator are so chosen that the gating pulse overlaps in point of time that portion of the field-retrace interval of the composite video signal which includes the code signal components. The composite video signal is continuously applied to the input circuit of amplifier 26, but only the information contained during the interval of the gating pulse is translated to filter and rectifier units 31–36. Amplifier 26 is thus "opened" during the times the signal bursts of various frequencies, representing the combination of code signal components, are received and since units 31–36 are individually tuned to an assigned one of these frequencies, such bursts are separated out from the composite video signal and from each other. Each time a burst of signal frequency occurs in the code signal combination, it is channeled over a corresponding input circuit of transposition mechanism 38 to one of the input circuits of bi-stable multivibrator 39 for selective application thereto.

If the various switch elements of transposer 38 are adjusted to the same seting as the corresponding transposition meachanism at the transmitter, the input circuits of bi-stable multivibrator 39 receive pulses similar to those received by the input circuits of a similar multivibrator at the transmitter. Multivibrator 39 therefore produces a composite reset signal for application to transient detector 40 which is identical in wave form to that developed at the transmitter for application to its detector.

Either the first or last amplitude variation of the composite reset signal is selected in detector 40, depending on whether a first- or last-transient detector is employed in the system as described in the aforementioned Roschke application, to reset counting mechanism 41 so that the output signal from that mechanism undergoes amplitude excursions in synchronism with the output signal of a similar counting mechanism at the transmitter. The control or decoding signal thereby developed in multivibrator 41 is applied to video decoder 17 to effect actuation thereof in time coincidence with the actuation of a similar video coder at the transmitter so that the video components applied to the input electrodes of image-reproducing device 21 are suitably compensated to effect intelligible image reproduction.

Figure 2:
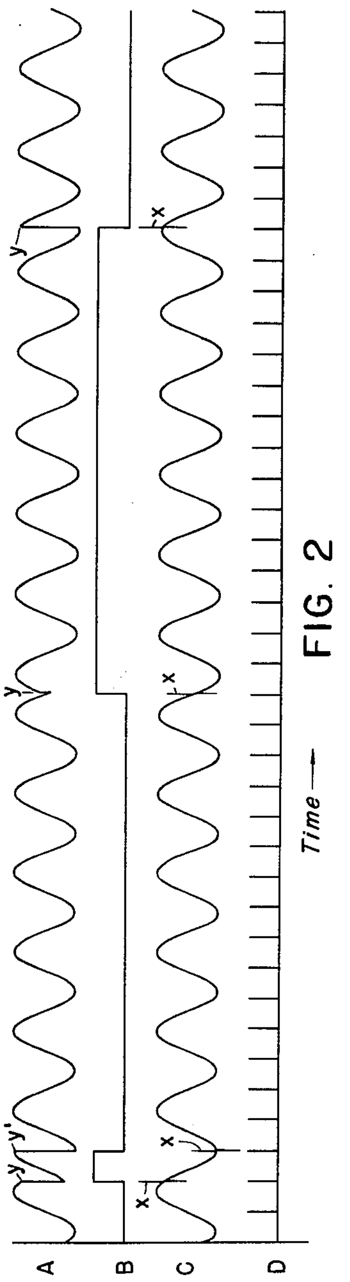
Figure 3:
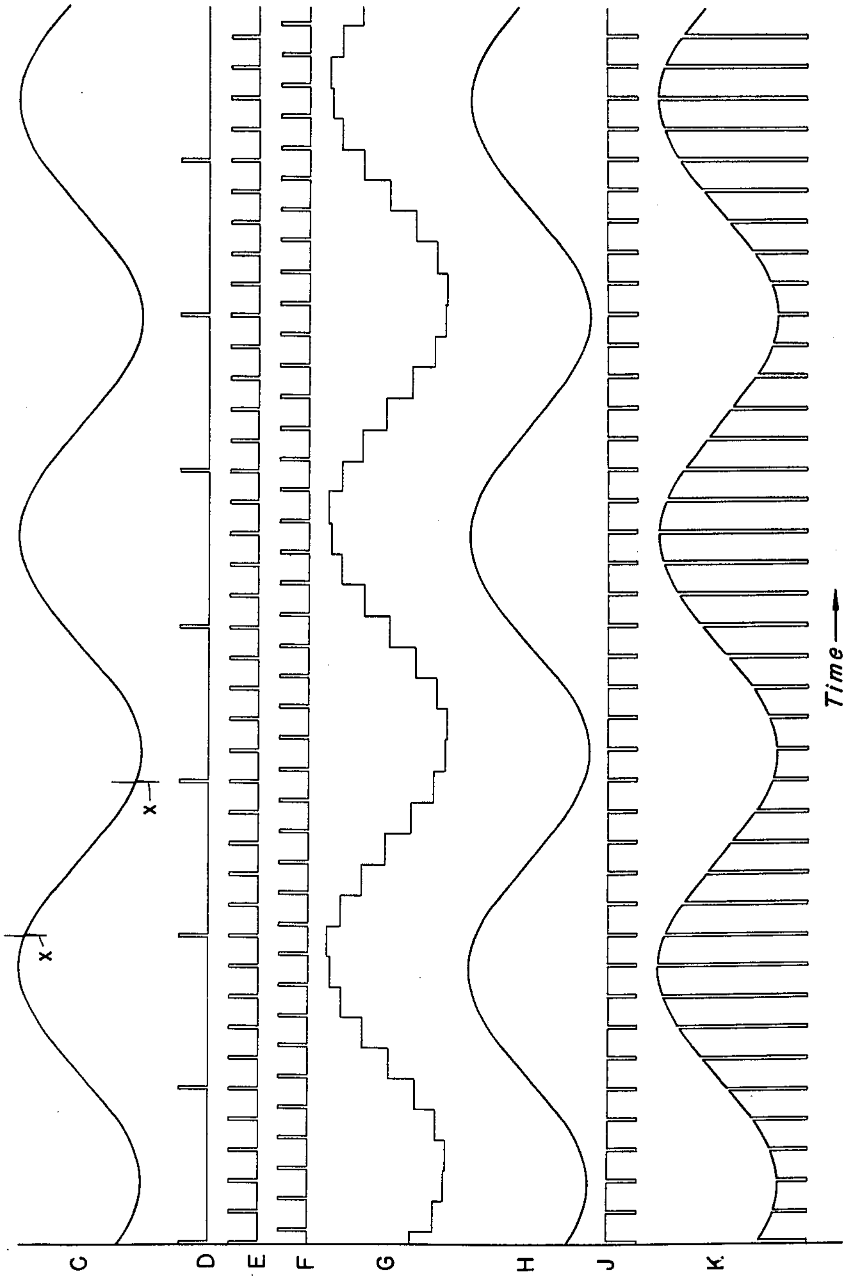

Consideration will now be given to the particular manner in which transient distortion that may otherwise result from the audio decoding process is eliminated in accordance with the invention, with reference to the idealized waveforms of FIGURES 2 and 3. An intercarrier-sound signal derived from video amplifier 16 is amplitude limited in unit 48 and detected in discriminator-detector 49. The coded audio signal, which is amplified in amplifier 50 and applied to decorder 51, is illustrated for convenience in curve A as a sinusoidal signal wave having a frequency of approximately 6,000 cycles per second and characterized by various phase inversions $y$ occurring in a pattern established by the audio coder at the transmitter. It will be made apparent hereinafter that these phase inversions or mode changes in the audio signal, with the exception of the mode change $y'$, the second from the left in curve A, occur at every 15 line-trace intervals or at a frequency of approximately 525 cycles per second under the present RTMA scanning standards. The mode change $y'$ represents the effect of the reset mechanism at the transmitter in establishing a reference phase condition from time to time as described in the aforementioned Roschke application.

In order to effect compensating phase inversions and accomplish decoding of the coded audio signal of curve A, multivibrator 41 is actuated in accordance with the code schedule employed at the transmitter and develops the control signal of curve B having amplitude variations occurring in time coincidence with the mode changes introduced at the transmitter and, consequently, in synchronism with the phase reversals of the received coded audio signal. The control signal is applied to the deflection electrodes of decoder 51 and the amplitude variations thereof deflect the beam of the beam-type decoder 51 to invert the phase of the signal translated therethrough and thereby produce at the output terminals of the decoder a decoded audio signal having the wave shape shown in curve C. Undesirable transient distortion, shown as pulses $x$ in curve C, are usually introduced during the decoding process. For convenience, transient pulses $x$ are drawn on a reduced scale in the illustrated diagram; it will be appreciated that these pulses are usually many times greater in amplitude than the intelligence signal. Such distortion may result from the transfer characteristic of the beam-deflection tube and may also be attributed to the load circuit of the tube, especially if it includes an output transformer. It occurs during the transient intervals in which the deflection signal of curve B undergoes sharp amplitude variations.

Concurrently with the operation of decoder 51, line-synchronizing pulses shown in curve D are applied to harmonic generator 70 wherein they are multiplied by a factor of 5. For convenience, portions of the waveforms of curves C and D (embracing the time interval during which the first two transient pulses $x$ occur) have been redrawn in FIGURE 3 on an expanded time base. Curve E of FIGURE 3 represents the pulses developed in generator 70, and these pulses are delayed in line 71 for an interval slightly longer than the duration of a line-synchronizing pulse to provide the delayed pulse signals of curve F for application to one pair of input terminals of sampler 72. The decoded audio signal of curve C is applied to a second pair of input terminals of sampler 72 and is sampled or read at the occurrence of each pulse of curve F. This reading or sampling process which is accomplished in apparatus to be described more particularly hereinafter produces an output signal represented in curve G, consisting of the sampled portions of the signal of curve C. Because of the delay introduced by delay line 71, the sampling times do not occur within or during a line-synchronizing pulse. On the other hand, the undesirable transient distortion (portions *x, x* of curve *c*) introduced by the deflection of the beam in decoder 51 does occur within the line-synchronizing pulse intervals during which no sampling of the signal (curve C) takes place. Consequently, the output signal of the sampler (curve G) is free of such distortion.

The signal of curve G is applied to frequency-selective device or low-pass filter 73 wherein it is shaped to produce the signal of curve H which is a simulation of the decoded audio signal of curve C prior to sampling except that the objectionable distortion has been deleted.

In order to detect accurately the envelope of the signal of curve G, the characteristics of filter 73 are determined in well-known manner to attenuate completely signals having a frequency equal to or greater than the sampling frequency minus the highest audio frequency desired to be reproduced. In the specific embodiment of FIGURE 1, the low-pass filter should be designed to attenuate completely signals having a frequency of 63,750 cycles per second or greater since that is the value obtained when the highest audio frequency to be reproduced, 15,000 cycles per second under present United States Government standards, is subtracted from the sampling frequency, which for the case described is 5 times the line-scanning frequency or 78,750 cycles per second. A lower sampling frequency may be utilized but at the sacrifice of some fidelity. For example, the sampler may be operated at the line-scanning rate of 15,750 cycles per second and the low-pass filter may be designed to attenuate all signals having a frequency of 8750 cycles per second or higher, in which case the highest audio signal which will be reproduced is (15,750–8750) 7000 cycles per second.

The signal of curve H is applied to speaker 52 and the sound intelligence is reproduced without a perceptible trace of the transient distortion introduced as an incident to the decoding process.

In summary, audio decoder 51 achieves compensating variations in a characteristic (specifically, the phase) of the received but coded audio signal between a plurality of different modes to develop a decoded or altered audio signal. However, the transitions between modes are subject to be accompanied by transient distortions which appear in the decoded signal at mode-changing intervals established in accordance with the code schedule of the transmission. This schedule is represented by the amplitude excursions of the control signal of curve B produced in counter 41. Harmonic generator 70, delay line 71 and sampling circuit 72 constitute sampling means coupled to decoder 51 for effecting sampling of the decoded audio signal only at spaced time intervals other than the aforementioned mode-changing intervals. Low-pass filter 73 constitutes means for shaping the wave form of the output signal from the sampling means to simulate that of the decoded audio signal except for the transients *x, x* introduced in the decoding process.

Figure 4:
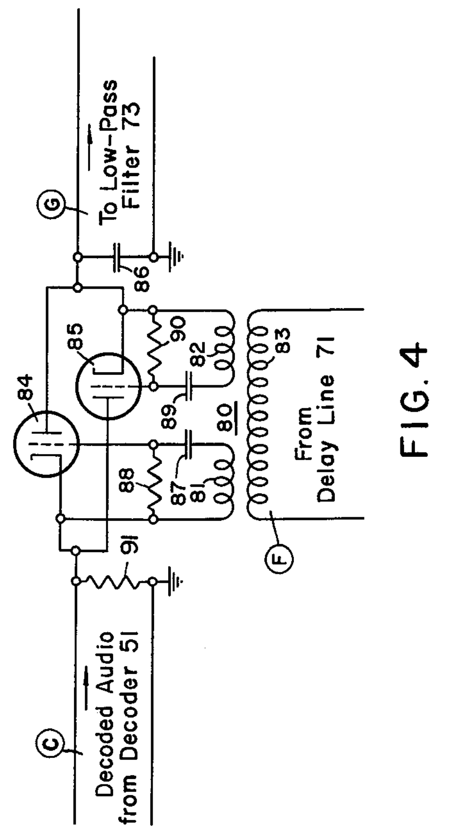
FIGURE 4 is a detailed schematic representation of a portion of the receiver illustrated in FIGURE 1.

Sampler 72 may be of conventional construction; the schematic diagram of FIGURE 4 shows in detail one such sampling device of the two-way clamp type. Specifically, positive pulses of curve F are applied to the primary winding 83 of a transformer 80 to develop positive keying or control pulses in secondary windings 81 and 82. One terminal of winding 81 is connected directly to the cathode of an electron-discharge device 84 and the other terminal is connected through a coupling condenser 87 to the control grid of device 84 for keying or rendering that device conductive only during the occurrence of the pulses of curve F. A grid-leak resistor 88 is also connected between the cathode and control grid of device 84. Similarly, one terminal of winding 82 is connected directly to the cathode of an electron-discharge device 85 and the other terminal is connected through a coupling condenser 89 to the control grid of device 85 for rendering that device conductive only during the occurrence of the pulses of curve F. A grid-leak resistor 90 is also connected between the cathode and control grid of device 85.

The decoded audio signal of curve C is applied across an input resistor 91, one terminal of which is connected to the cathode of device 84 and also to the anode of device 85 and the other terminal of which is connected to ground. The anode of device 84 and the cathode of device 85 are connected in common to one terminal of a condenser 86, the other terminal of which is connected to ground. The two termnials of condenser 86 are also connected to the input terminals of low-pass filter 73.

With this arrangement, the audio signal appearing across resistor 91 is sampled and devices 84 and 85 adjust the charge of condenser 86 to a potential level representing the amplitude of the audio signal during the occurrence of each pulse of curve F. Condenser 86 initially charges to the instantaneous potential of the audio signal through device 85 when that device is rendered conductive in response to the first control pulse applied to transformer 80. The condenser retains its charge until the next control or keying pulse appears. As the amplitude of the audio signal across resistor 91 varies, condenser 86 either charges or discharges, in response to each pulse of curve F to the instantaneous value of the audio intelligence. If the potential of the audio signal at the time of any keying pulse exceeds that of condenser 86, device 85 conducts to charge condenser 86 to the same potential. If the instantaneous potential of the audio signal at the time of any keying pulse is less than that of condenser 86, device 84 conducts to discharge condenser 86 to the correct potential. The audio signal is sampled in this manner and the signal of curve G is developed.

Figure 5:
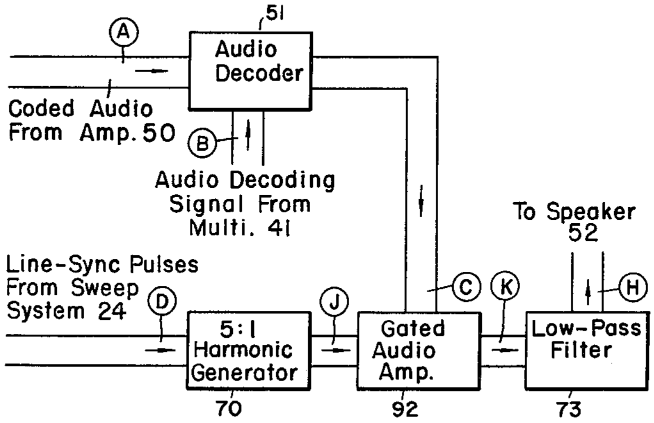
FIGURE 5 represents a portion of the receiver illustrated in FIGURE 1 constituting another embodiment of the invention.

The sampling device may take the form of a well-known normally-closed gated amplifier which translates an applied audio signal except during intervals in which it is cut-off or rendered non-conductive by keying or control pulses. If the control pulses are phased to occur during the beam-deflection intervals of decoder 51 when transient distortion is manifest, such distortion is "gated out" or effectively removed from the decoded audio signal. FIGURE 5 shows such a sampling arrangement which may be substituted for the corresponding components in the receiver of FIGURE 1. Sampling circuit 72 and delay line 71 are replaced by a conventional gated amplifier 92. In this embodiment, the pulses applied to the gated amplifier 92 from harmonic generator 70 are undelayed and are of negative polarity as shown in curve J. This amplifier also receives the decoded audio signal of curve C and produces at its output terminals, which may be connected across a cathode resistor (not shown) of the amplifier, a signal having the wave form of curve K. Each time a pulse of curve J appears, the amplifier is cut-off and the output potential at the cathode returns to a reference value, such as ground. The control pulses are so phased with respect to the line-synchronizing components that the gated amplifier is cut-off during line-retrace periods and consequently during the occurrence of transient pulses $x$, $x$ of curve C. The output signal (curve K) of gated amplifier 92 is applied to low-pass filter 73.

Figure 6:
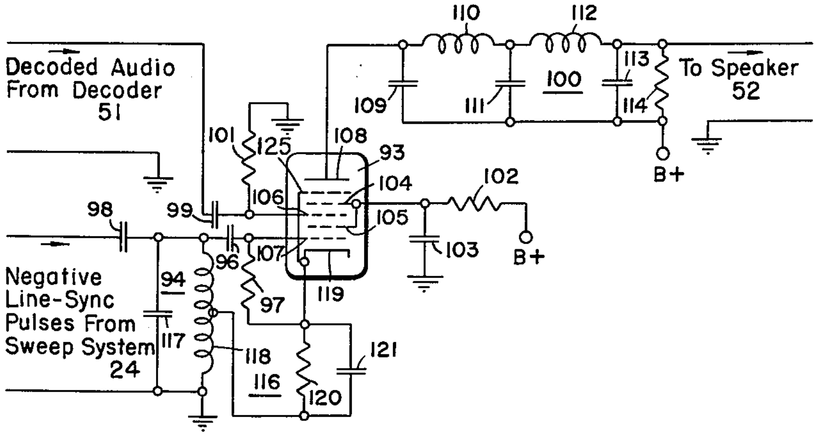
FIGURE 6 is a detailed schematic representation of a preferred construction of the arrangement illustrated in FIGURE 5.

A preferred construction of the sampling and filtering units of FIGURE 5 is illustrated in FIGURE 6. It comprises an electron-discharge device 93 of the pentagrid converter type. Its cathode 119, first first control or oscillator grid 107 and first screen grid or oscillator anode 105 are connected to constitute a Hartley oscillator 116. Oscillator 116 comprises a parallel-tuned network 94 including a condenser 117 and an inductance coil 118, one terminal of the network being grounded and the other being connected through a coupling condenser 96 to the oscillator control grid 107. Cathode 119 is coupled through a resistor 120, shunted by a bypass condenser 121, to a point on inductance coil 118. A grid-leak resistor 97 is connected between control grid 107 and cathode 119. The oscillator anode 105 is coupled through a resistor 102 to a source of unidirectional potential B+, anode 105 also being coupled to ground via a condenser 103. Network 94 is also coupled to line-sweep system 24 by means of a coupling condenser 98 in order to derive negative polarity line-synchronizing pulses therefrom.

Second control grid 106 of the pentagrid converter is coupled to decoder 51 via a condenser 99 to receive the decoded audio signal and is grounded through a grid-leak resistor 101. Second screen grid 104 is connected to B+ via a resistor 102 and suppressor electrode 125 is connected to cathode 119. Finally, the anode or plate 108 is coupled through a conventional low-pass $\pi$-type filter network 100 to speaker 52. Specifically, network 100 has two serially-connected inductance coils 110, 112, and includes shunt condensers 109, 111 and 113. The network has a terminating resistor 114 through which a source of unidirectional potential B+ is connected to anode 108 of the pentagrid converter.

Preferably, oscillator 116 is adjusted to oscillate at a frequency approximately five times that of the line-scanning frequency and is "locked-in" to the line-scanning frequency by virtue of the synchronizing pulses applied to network 94. With this arrangement, device 93 is conductive only during the peak portion of each positive half cycle of the oscillator and the signal applied to signal grid 106 is translated only during such periods of conductivity. In this way, device 93 is effectively gated on and off at a rate determined by the frequency of the oscillator, namely, five times the line-scanning rate.

In this fashion, the decoded audio signal from decoder 51, including the pulses of transient distortion, which is applied to grid 106 is sampled. The oscillator is so phased that device 93 conducts only during intervals between the applied line-synchronizing pulse. Consequently, the pulses representing transient distortion are not translated to anode 108 of device 93 since the tube is cut-off during the occurrences of such transients. The output signal from tube 93 is filtered in filter 100 to remove high frequency components as explained hereinbefore in order to simulate the original wave shape of the decoded audio signal, minus the undesirable transients, for application to speaker 52.

The invention provides, therefore, an improved method for producing a coded or decoded intelligence signal that is relatively free of transient distortion which may be introduced during the coding or decoding process. This is very effectively achieved by sampling the coded or decoded intelligence signal only at times other than the mode-changing or transient distortion times and then shaping the wave form of the output signal containing the sampled portions to simulate that of the coded or decoded intelligence signal prior to sampling.

While particular embodiments of the invention have been shown and described, modifications may be made, and it is intended in the appended claims to cover all such modifications as fall within the true spirit and scope of the invention.

I claim:

1. A method of altering an intelligence signal under the control of a control signal without introducing transient distortion comprising the steps of: sharply and abruptly varying a characteristic of said intelligence signal at selected times determined by a predetermined code schedule as represented at least in part by said control signal to alter said intelligence signal; sampling said altered intelligence signal under the control of said control signal only at times different from said selected times; deriving an output signal consisting of the sampled portions of said altered intelligence signal; and shaping the wave form of said output signal to simulate that of said altered intelligence signal prior to sampling.

2. A method of decoding a coded audio signal under the control of a decoding signal without introducing transient distortion comprising the steps of: sharply and abruptly inverting the phase of said coded audio signal at selected times determined by a predetermined code schedule as represented at least in part by said decoding signal to develop a decoded audio signal; sampling said decoded audio signal under the control of said decoding signal only at times different from said selected times; deriving an output signal consisting of the sampled portions of said decoded audio signal; and shaping the wave form of said output signal to simulate that of said decoded audio signal prior to sampling.

No references cited.